United States Patent
Lee

(10) Patent No.: US 8,555,849 B2
(45) Date of Patent: Oct. 15, 2013

(54) PISTONS FOR INTERNAL COMBUSTION ENGINES

(75) Inventor: David Lee, Belleville, MI (US)

(73) Assignee: Ricardo UK Limited, West Sussex (GB)

( * ) Notice: Subject to any disclaimer, the term of this patent is extended or adjusted under 35 U.S.C. 154(b) by 551 days.

(21) Appl. No.: 12/523,691

(22) PCT Filed: Jan. 7, 2008

(86) PCT No.: PCT/GB2008/000030
§ 371 (c)(1),
(2), (4) Date: Nov. 19, 2009

(87) PCT Pub. No.: WO2008/087375
PCT Pub. Date: Jul. 24, 2008

(65) Prior Publication Data
US 2010/0065008 A1     Mar. 18, 2010

(30) Foreign Application Priority Data
Jan. 19, 2007   (GB) .................................. 0701110.9

(51) Int. Cl.
*F02F 3/00*   (2006.01)

(52) U.S. Cl.
USPC .......................... 123/193.6; 277/463; 277/464

(58) Field of Classification Search
USPC ................................ 123/193.6; 277/463–464
See application file for complete search history.

(56) References Cited

U.S. PATENT DOCUMENTS

| | | | | |
|---|---|---|---|---|
| 2,893,801 A | * | 7/1959 | Heid, Jr. ......................... | 277/481 |
| 3,024,029 A | * | 3/1962 | Brenneke ...................... | 277/451 |
| 3,195,905 A | * | 7/1965 | Brenneke ...................... | 277/481 |
| 3,253,836 A | * | 5/1966 | Hamm ........................... | 277/474 |

(Continued)

FOREIGN PATENT DOCUMENTS

| DE | 44 09 092 A1 | 9/1995 |
|---|---|---|
| DE | 44 13 324 A1 | 10/1995 |

OTHER PUBLICATIONS

International Search Report for PCT/GB2008/000030 mailed Apr. 4, 2008 (3 pages).

(Continued)

*Primary Examiner* — Marguerite McMahon
*Assistant Examiner* — James Kim
(74) *Attorney, Agent, or Firm* — Osha Liang LLP

(57) ABSTRACT

A piston for an internal combustion engine includes a piston crown (2) and a cylindrical side wall (4), an annular piston ring groove (8) being formed in the side wall (4) which accommodates an annular spring (14). The spring (14) includes an annular radially extending portion (16) and first (20) and second (22) projections. The radially extending portion (16) divides the annular groove into two chambers in the axial direction of the piston. The upper chamber closest to the piston crown accommodates an annular compression ring (10). The lower chamber furthest from the piston crown accommodates an annular oil scraper ring (12). The first projection (20) is arranged to contact the upper surface closest to the piston crown of the annular groove (8). The second projection (22) is arranged to contact the inner surface of the oil scraper ring (12) to urge it outwardly. The height of the upper chamber in the axial direction is greater than that of the compression ring (10), whereby in use, the pressure acting on the piston crown will act also on the inner surface of the compression ring (10) and urge it in the outward direction.

5 Claims, 1 Drawing Sheet

(56) References Cited

U.S. PATENT DOCUMENTS

Figure 1:
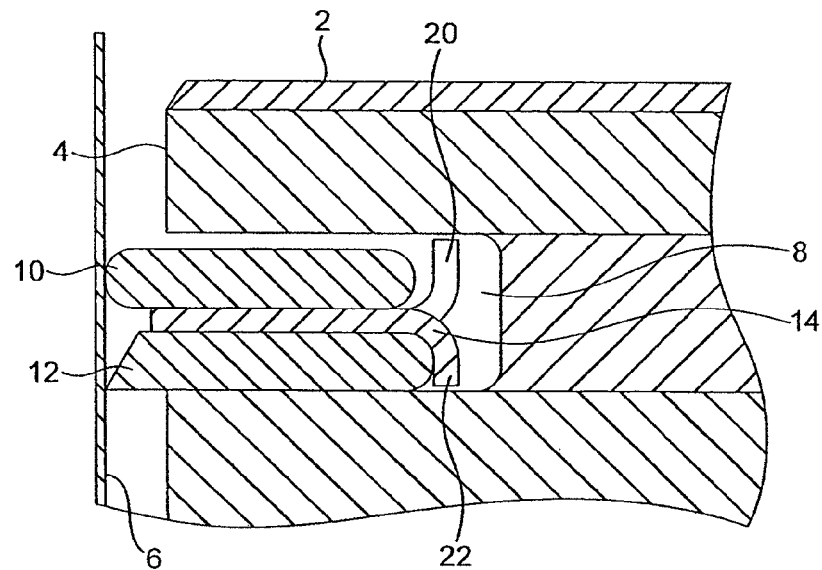

| | | | | |
|---|---|---|---|---|
| 3,323,807 A | * | 6/1967 | Vanderbilt, Jr. | 277/481 |
| 3,477,732 A | * | 11/1969 | Warrick | 277/478 |
| 4,090,720 A | * | 5/1978 | Morsbach et al. | 277/478 |
| 4,183,544 A | * | 1/1980 | Morsbach et al. | 277/481 |
| 4,408,770 A | * | 10/1983 | Nemets et al. | 277/478 |
| 4,429,885 A | * | 2/1984 | Chiba et al. | 277/480 |
| 4,462,602 A | * | 7/1984 | Brauers et al. | 277/478 |

OTHER PUBLICATIONS

Written Opinion of ISA for PCT/GB2008/000030 mailed Apr. 4, 2008 (4 pages).

United Kingdom Intellectual Property Office Search Report dated May 2, 2007 (1 page).

* cited by examiner

PISTONS FOR INTERNAL COMBUSTION ENGINES

The present invention relates to pistons for internal combustion engines of reciprocating piston type, particularly 4-stroke engines and is particularly concerned with the piston rings of such pistons.

The primary purpose of a piston in an internal combustion engine is of course to transfer the energy of the burning fuel in the combustion space defined between the piston and the cylinder head within the cylinder in which the piston is slidably accommodated to the crankshaft of the engine which converts the linear reciprocating motion of the piston into rotary motion. However, pistons also have a number of subsidiary functions and one of these is to substantially seal the combustion space from the crankcase situated below the piston in which the crankshaft is rotatably accommodated so as to prevent the cyclically varying pressure within the combustion space from acting within the crankcase. A further subsidiary function is to retain substantially all of the lubricating oil in the crankcase and prevent it from passing around the piston into the combustion space where it would of course be burnt. These subsidiary functions are typically performed by one or more piston rings accommodated in respective annular grooves formed in the cylindrical side surface of the piston.

Pistons are typically provided with two or more piston rings, the lower one of which, that is to say, the piston ring furthest from the top or crown of the piston constitutes an oil stripper or scraper ring and is urged outwardly into sliding contact with the wall of the cylinder by its own resilience and/or by a spring engaging it. As the piston moves downwardly towards the crankshaft, the oil scraper ring scrapes oil from the wall of the cylinder and urges it downwardly towards the crankcase and thus prevents the oil from flowing past the piston into the compression space. The upper piston ring or rings constitute compression rings and they form a substantially gas-tight seal with the cylinder wall. The height of the or each compression ring in the axial direction of the piston is normally somewhat less than that of the associated groove, whereby a certain amount of tilting movement of the piston ring within the groove is permitted. The clearance permits the high pressure prevailing within the compression space to gain access to the rear or inner surface of the compression ring and this pressure acts to urge the compression ring outwardly and thus into sealing contact with the wall of the cylinder. Although it is known in certain engines to provide only a single annular groove in the side surface of the piston accommodating a single piston ring which performs the function of both a compression ring and an oil stripper ring, this is found to not be practicable in automotive or larger engines of 4 stroke type.

The provision of two, three or even more annular grooves in the wall of pistons and the associated piston rings is relatively complex and constitutes a significant proportion of the total cost of a piston. Furthermore, the provision of two or more piston rings results in the height of the piston being greater than might otherwise be necessary and thus in the entire engine being higher than might otherwise be the case.

It is therefore the object of the invention to provide a piston, particularly for a 4 stroke engine, which will perform all of its intended functions satisfactorily but is cheaper and easier to manufacture than conventional pistons. It is a further object of the invention to provide such a piston which is inherently shorter and thus lighter than comparable known pistons and produces less sliding friction and greater potential for cooling the piston than comparable known pistons.

According to the present invention, a piston for internal combustion engines of the type including a piston crown and a cylindrical side wall, an annular piston ring groove being formed in the side wall which accommodates an annular ring, is characterised in that the ring includes an annular, radially extending portion and first and second projections, that the radially extending portion divides the annular groove into two chambers in the axial direction of the piston, that the upper chamber closest to the piston crown accommodates an annular compression ring, that the lower chamber furthest from the piston crown accommodates an annular oil scraper ring, that the first projection is arranged to contact the upper surface closest to the piston crown of the annular groove, that the second projection is arranged in contact with the inner surface of the oil scraper ring to urge it outwardly and that the height of the upper chamber in the axial direction is greater than that of the compression ring, whereby, in use, the pressure acting on the piston crown will act also on the inner surface of the compression ring and urge it in the outward direction.

Thus the piston in accordance with the present invention has only single piston ring groove formed in its outer wall in the place of two piston ring grooves in the known pistons and this represents a considerable economy in manufacturing expense. However, whilst it is of course conventional for a piston ring groove to accommodate only one piston ring, the piston ring groove in the piston of the present invention accommodates two separate piston rings, the upper ring constituting a compression ring and the lower ring constituting an oil scraper ring in the conventional manner. The two piston rings are accommodated within separate chambers defined within the piston ring groove by a spring which, like the piston rings themselves, is of course necessarily substantially annular. This spring includes a radially extending portion which divides the piston ring groove into two chambers and first and second projections which engage the upper surface of the piston ring groove and the rear surface of the oil scraper ring, respectively. The engagement of the first projection with the upper surface of the piston ring groove will retain the spring substantially in its axial position and thus restrain axial movement of the oil scraper ring. The engagement of the second projection with the rear surface of the oil scraper ring permits the spring, which exerts a radially outward force to urge the oil scraper ring in the outward direction and thus into close contact, in use, with the adjacent wall of the cylinder in which the piston is accommodated. Whilst the oil scraper ring is provided with only little clearance in its chamber in the axial direction, that is to say that the height of the oil scraper ring is substantially the same as that of which the chamber in which it is accommodated, the compression ring is provided with a significant clearance whereby limited tilting movement of the compression ring is possible as the piston changes from moving upwardly to moving downwardly and visa versa. This clearance in the upper chamber will permit the high pressure gases which are present, in use, in the combustion chamber above the piston crown to gain access to the inner or rear edge of the compression ring and thus to force the compression ring outwardly into close and substantially sealing, sliding contact with the wall of the cylinder.

The piston in accordance with the present invention thus possesses both a compression piston ring and a spring energised oil scraper piston ring accommodated within a single piston ring groove and, as mentioned above, this results in a saving in manufacturing complexity and expense. It also enables the overall height of the piston to be reduced by comparison with a piston with two or more axially spaced piston ring grooves and this in turn enables the overall height and weight of the engine to be reduced. The reduction in the number of piston ring grooves also permits the piston to be cooled more effectively. Thus the pistons of some gasoline engines and most highly rated diesel engines have internal chambers, referred to as galleries, through which oil is passed in order to cool the piston. The space available for the gallery is usually very limited and the reduction in the number of piston ring grooves in accordance with the invention will permit a gallery of larger volume to be provided, through which of course a greater volume of cooling oil may be passed.

The piston preferably has only a single piston ring groove and this groove will of course accommodate the compression ring and the oil scraper ring. In this event, the piston will have a total of two piston rings and whilst this is adequate for many purposes, it is of course possible to provide an additional piston ring groove accommodating a further compression ring. In this event, the number of compression ring grooves will be reduced from three to two and all the advantages referred to above will still be achieved.

In the preferred embodiment, a plurality of substantially radially extending, circumferentially spaced slits or cut outs are formed in the inner edge of the radially extending portion of the spring, thereby dividing the said inner edge into a plurality of tabs, certain of the tabs being bent to extend upwardly towards the piston crown and constituting the first projection and certain of the tabs being bent downwardly away from the piston crown and constituting the second projection. It is convenient and preferred for alternate tabs in the circumferential direction to be bent upwardly and downwardly, whereby the spring will afford both an upwardly and downwardly extending castellated formation integral with its inner edge.

It is preferred also that there is a plurality of substantially radially extending, circumferentially spaced slits formed in the outer edge of the radially extending portion which are offset from the slits formed in the inner edge and are preferably positioned midway between adjacent pairs of slits formed in the inner edge. The slits in the outer edge do not contribute to the function of the spring in accordance with the invention but are provided primarily for manufacturing reasons.

Figure 2:
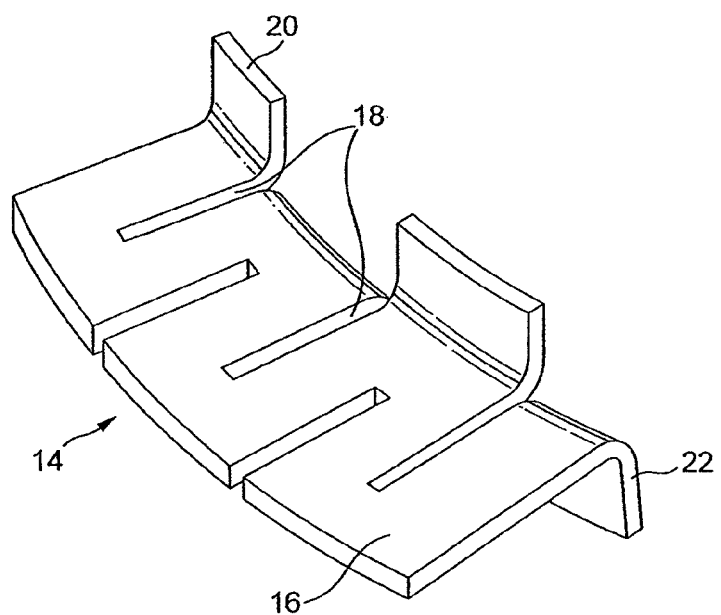

Further features and details of the invention will be apparent from the following description of one specific embodiment of a piston for a 4 stroke gasoline engine which is given by way of example only with reference to the accompanying drawings which:

FIG. 1 is a scrap axial sectional view of a piston in accordance with the invention within a cylinder; and FIG. 2 is a scrap perspective view of the annular spring used in the piston of FIG. 1.

FIG. 1 shows a piston including a crown or upper surface (2) and a cylindrical side surface (4). In use, the piston is reciprocally accommodated within a cylinder, of which only one wall (6) is shown, of a 4 stroke gasoline engine. Formed in the cylindrical side surface (4) is a piston ring groove (8) whose height in the axial direction of the piston is typically 3 mm to 4 mm, e.g. 3.5 mm, that is to say somewhat greater than that of a conventional automotive gasoline piston ring groove but similar to that of a conventional automotive diesel piston ring groove. Accommodated within the groove (8) is an annular compression ring (10) an annular oil scraper ring (12) and an annular spring (14). Each of these three components constitutes a discontinuous annulus, that is to say a split ring, and is made of spring steel to permit it to be deformed sufficiently to allow it to be introduced into the groove (8). Thereafter it returns to its natural substantially circular shape under the influence of its own resilience. The compression ring (10) has a generally conventional shape and its outer edge which, in use, slidingly contacts the surface of the cylinder is of barrel or arcuate shape in cross section. The oil scraper ring (12) is also of generally conventional shape and its outer edge, which slidingly contacts the surface of the cylinder, is of wedge shape with its apex contacting the cylinder wall.

The construction of the annular spring may best be seen in FIG. 2. It comprises a generally planar annular portion (16), formed in whose inner edge are radially inwardly extending slits or cut outs (18), thereby dividing the inner edge of the spring into a plurality of generally rectangular tabs. Every alternate tab (20) is bent upwardly whilst the remaining tabs (22) are bent downwardly. The width of the planar portion (16) in the radial direction is substantially the same as the depth of the groove (8) in the radial direction and thus once the spring is within the recess it divides it substantially into two chambers, an upper chamber and a lower chamber. The projections (20) engage the upper surface of the groove (8) and thus limit movement of the spring in the upward direction, that is to say towards the piston crown (2). The lower chamber accommodates the oil scraper ring (12) and the planar portion (16) of the spring rests on the upper surface of the ring (12), whereby there is only a small clearance or free space in the axial direction in the lower chamber. The height of the upper chamber however, is greater than the thickness of the compression ring (10) and there is therefore a clearance or a gap in the axial direction of the conventional size. The downward projections (22) engage the rear or inner edge of the oil scraper ring (12) and the resilience of the spring (14) causes the projections (22) to bias the oil scraper ring (12) outwardly and thus into sliding contact with the cylinder wall. The compression ring (10), on the other hand, is biased outwardly by the high pressure which prevails, in use, in the combustion space above the piston crown (2) and acts on the rear or inner surface of the compression spring (10), to which the high pressure has access via the gap or clearance between the upper portion of the cylindrical wall (4) of the piston and the wall (6) of the cylinder and the clearance or gap between the compression ring (10) and the upper surface of the groove (8). The oil scraper ring will also be biassed outwardly by the cylinder gas pressure but the primary outward force on this ring is provided by the spring.

In use, the oil scraper ring has little or no freedom of axial movement because it is retained in position by the planar portion (16) of the spring and by engagement of the projections (20) with the upper surface of the groove (8). The chamber in which the compression ring (10) is accommodated, on the other hand, has a height greater than that of the ring (10) whereby a certain amount of the axial movement is possible. The range of movement is, however, extremely limited. Thus the construction and movement and also the mountings of the two piston rings substantially mimic those of the piston rings in conventional pistons and the primary difference is of course that they are both accommodated in a single piston ring groove and separated by a portion of a spring.

The invention claimed is:

1. A piston for an internal combustion engine comprising:
a piston crown;
a cylindrical side wall; and
an annular piston ring groove being formed in the cylindrical side wall which accommodates an annular spring,
wherein the annular spring comprises a single annular radially extending portion, a first projection, and a second projection, wherein the annular radially extending portion divides the annular piston ring groove into only two chambers in an axial direction of the piston, wherein an upper chamber closest to the piston crown accommodates an annular compression ring, wherein a lower chamber furthest from the piston crown accommodates an annular oil scraper ring, wherein the first projection is arranged to contact an upper surface closest to the piston crown of the annular piston ring groove, wherein the second projection is arranged to contact an inner surface of the annular oil scraper ring to urge it outwardly, and wherein a clearance exists between the compression ring and the upper surface of the annular piston ring groove closest to the piston crown extending from an inner surface of the compression ring to an outer surface of the compression ring, and wherein a clearance exists between the first projection and the inner surface of the compression ring whereby the first projection does not contact the inner surface of the compression ring, whereby in use, a pressure acting on the piston crown will act also on the inner surface of the compression ring and urge it in an outward direction.

2. The piston of claim 1, wherein a plurality of substantially radially extending circumferentially spaced slits are formed in an inner edge of the annular radially extending portion of the annular spring, thereby dividing the inner edge into a plurality of tabs, wherein a first portion of the plurality of tabs are bent to extend upwardly toward the piston crown and constitute the first projection, and wherein a second portion of the plurality of tabs are bent to extend downwardly away from the piston crown and constitute the second projection.

3. The piston of claim 2, wherein alternate tabs in a circumferential direction are bent upwardly and downwardly.

4. The piston of claim 2, wherein the plurality of substantially radially extending circumferentially spaced slits are formed in at least one outer edges of the annular radially extending portion of the annular spring which is offset from the plurality of substantially radially extending circumferentially spaced slits formed in the inner edge.

5. The piston of claim 3, wherein the plurality of substantially radially extending circumferentially spaced slits are formed in at least one outer edges of the annular radially extending portion of the annular spring which is offset from the plurality of substantially radially extending circumferentially spaced slits formed in the inner edge.

* * * * *